Nov. 4, 1924.

C. B. TELLING 1,513,772

CONFECTION MAKING APPARATUS

Filed Feb. 7, 1922

2 Sheets—Sheet 1

INVENTOR.
Charles B. Telling
BY
Fay, Oberlin & Fay
ATTORNEYS

Nov. 4, 1924.
C. B. TELLING
1,513,772
CONFECTION MAKING APPARATUS
Filed Feb. 7, 1922      2 Sheets-Sheet 2
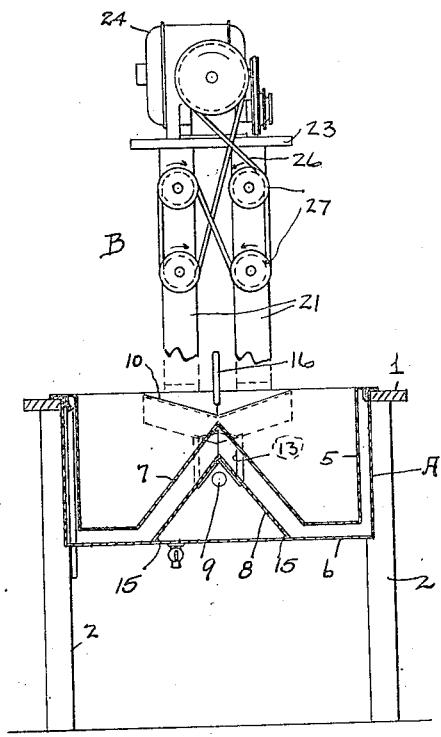
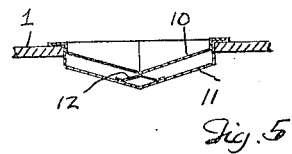
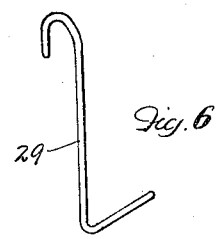
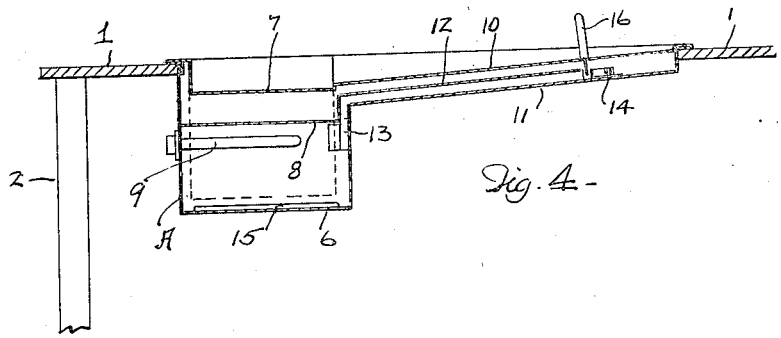
INVENTOR.
Charles B. Telling
BY
Jay, Oberlin & Jay
ATTORNEYS Patented Nov. 4, 1924.

1,513,772

UNITED STATES PATENT OFFICE.

CHARLES B. TELLING, OF CLEVELAND, OHIO.

CONFECTION-MAKING APPARATUS.

Application filed February 7, 1922. Serial No. 534,822.

*To all whom it may concern:*

Be it known that I, CHARLES B. TELLING, a citizen of the United States, and a resident of Cleveland, county of Cuyahoga, and State of Ohio, have invented a new and useful Improvement in Confection-Making Apparatus, of which the following is a specification, the principle of the invention being herein explained, and the best mode in which I have contemplated applying that principle so as to distinguish it from other inventions.

The present improvements relating, as indicated, to confection making apparatus have more particular regard to an apparatus or machine for manufacturing chocolate coated confections such as chocolate coated ice cream cakes. Because of the character of ice cream, even where solidly frozen, where it is desired to coat cakes thereof with chocolate, it is necessary to dip the cakes into the bath of chocolate and remove the same therefrom very quickly and without any stirring or sweeping action. Such dipping has accordingly heretofore always been done by hand. It is furthermore necessary to handle the cake after it has been coated, and especially while the coat is hardening, with great care to avoid breaking same on account of its fragile character.

One object of the present invention, accordingly, is to provide an apparatus that will greatly facilitate such hand dipping operation, reducing the manual labor to a minimum and eliminating the losses that are attendant upon the present crude method of manufacturing such ice cream confection. A further object is to provide means whereby the bath of chocolate may be readily maintained at the right temperature; and still another object is to provide for the recovery of the chocolate that drips from the dipped article before it has completely solidified.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 1:
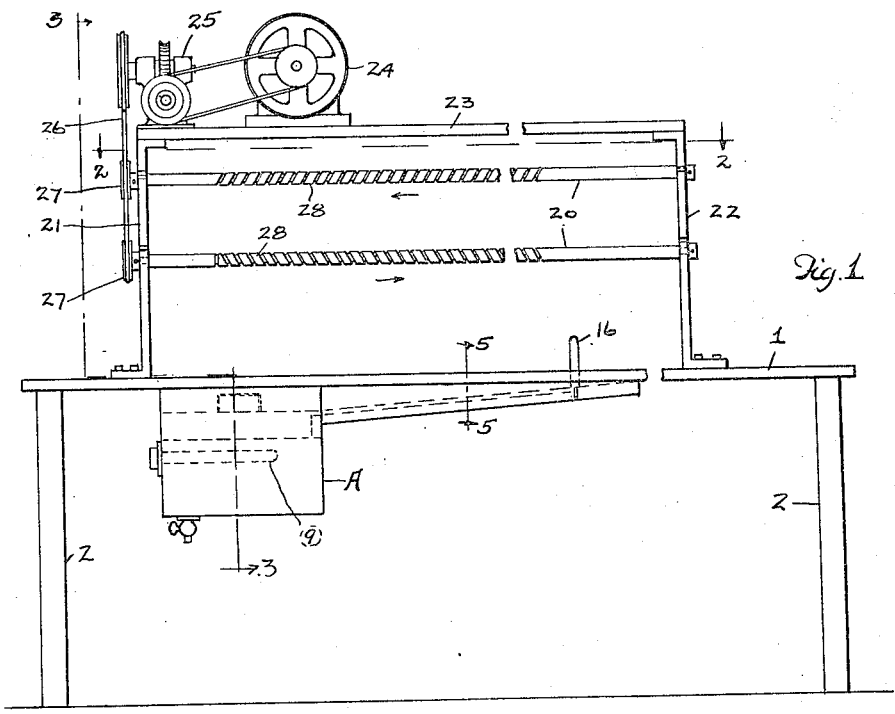
Figure 2:
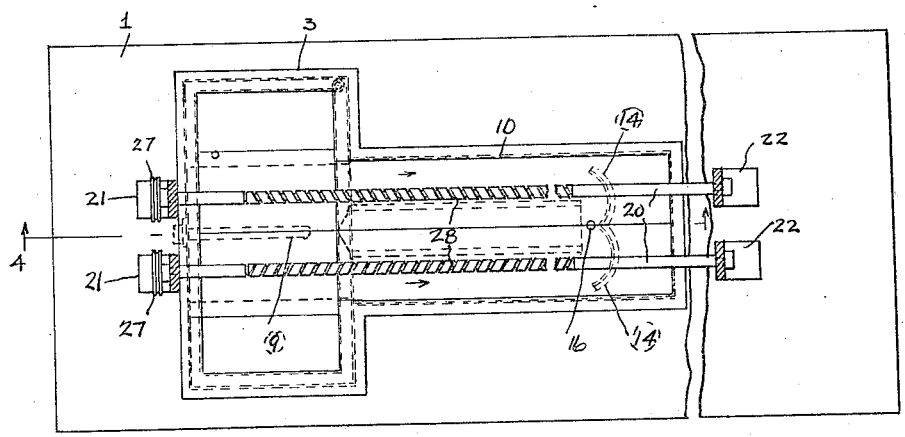

Fig. 1 is a side elevation of my improved apparatus; Fig. 2 is a plan view of the same; Fig. 3 is a broken transverse section thereof, the plane thereof being indicated by the line 3—3, Fig. 1; Fig. 4 is a longitudinal section taken on the plane indicated by the line 4—4, Fig. 2; Fig. 5 is a transverse section of a detail, the plane of the section being indicated by the line 5—5, Fig. 1; and Fig. 6 is a perspective view of one of the hooks employed in dipping the ice cream cakes in the chocolate bath and for subsequently attaching same to the apparatus.

In order to conserve factory space and at the same time simplify operation, the apparatus is preferably constructed in units, as shown, designed for two operators, but, as will be later explained, such unit may be advantageously worked by a single operator, if desired. The apparatus is conveniently mounted on a table 1, supported at the proper height by adjustable legs 2, and consists of two principal parts, viz., a tank A for the molten chocolate that is set into the table so as to depend therefrom; and the conveying mechanism B that is mounted on top of said table over said tank.

The tank A is located adjacent one end of the table and, as best shown in Figs. 2 and 3, extends transversely of such table practically the entire width thereof. Said tank comprises an interior chamber 5 enclosed laterally and across its bottom by a water jacket 6 and is divided into two compartments by an inverted V-shaped partition 7 disposed on the longitudinal median line of the table. A corresponding V-shaped partition 8 rises from the bottom wall of water jacket 6 so as to form a chamber in the latter into which extends an electric heating unit 9, or if other heating means, as for instance a gas burner, be employed, then the heat therefrom will be applied to the portion of said water jacket contained within said partition 8, as will be readily understood. Extending longitudinally of the table from the rear wall of tank A is a shallow trough 10 enclosed in a fashion similar to the tank by a water jacket 11, said trough sloping gradually upwardly from the point where it joins the tank to its outer end where it is practically flush with the top of the table 1. A partition 12 in such water jacket 11 forms a conduit that extends longitudinally thereof practically its entire length, such conduit being connected at its lower end with the upper portion of the chamber in the main water jacket 6, that is separated off by the partition 8, through the medium of a vertical conduit 13. In front of the upper or outer end of the conduit, thus formed by partition 12, two curved deflecting plates 14 are mounted in the water jacket 11, as shown in Fig. 2.

As the result of the foregoing construction it will follow that the water as it is heated by the heating unit 9, or other means in the compartment formed in water jacket 6 by the V-shaped partition 8, will rise through conduit 13 and conduit 12, and upon escaping from the upper end of the latter will be deflected into two streams by the curved plates 14 so as to flow back again through the respective outer portions of water jacket 11 to the corresponding side portions of water jacket 6. Suitable openings 15 are provided near the bottom of the respective sides of partition 8 so that the water upon thus returning to jacket 6 may again find its way into the compartment defined by said partition and thus complete the circulation. A thermometer 16 preferably extends through the upper end of trough 10 into the water jacket 11 at the upper terminus thereof and the temperature of the bath can be thereby regulated. The conveying apparatus B comprises in effect two duplicate parts, each consisting of a pair of screw-threaded shafts 20 rotatably supported at their respective ends in standards 21 and 22, rising vertically from the table 1, i. e., adjacent the front edge of tank A and just beyond the upper end of trough 10. A board or plate 23 connects said two standards and serves to support a motor 24 from which said shafts 20 are driven through a suitable reduction gear 25 and belt 26 that passes around pulleys 27 on the corresponding ends of said shafts in such manner as to cause all four spirals to turn toward center of said table. The helical grooves 28 on the shafts 20 are designed to receive the upper recurved end of a hook-like member 29, shown in Fig. 6, the lower end of which is bent at right angles and is adapted to be inserted into the cake of ice cream or like article to be dipped. The direction of the spiral grooves on said shafts moreover is such that, having regard to the direction of rotation of the shafts imparted by the driving mechanism just described, a hook thus engaged with the groove on the lowermost shaft of one pair will travel to the right, as viewed in Fig. 1, while the opposite side will travel to the left, from the one who dips. On the other hand, if a hook is engaged with the uppermost shaft, it will travel to the left on one side and to the right on the other side. The threaded portion of each shaft, it will be observed, terminates short of the respective ends of such shaft so as to leave a smooth section of same diameter with the result that the hooks 29 may hang stationary from such end portions of the shafts.

The operation of my improved apparatus as a whole may now be set forth. Assuming that two operators are to be employed, they will stand or else be seated opposite the respective sides of tank A. The frozen cakes of ice cream, or equivalent articles to be coated with chocolate, are stacked on the corresponding end of the table and are then lifted one by one by means of the hooks 29, dipped in the body of molten chocolate in the one compartment or the other of chamber 5 in said tank, and said hook then suspended on the lower screw shaft 20. The rotation of such shaft, as explained above, will carry the hook with the coated confection depending therefrom steadily towards the right on one side and to the left on opposite side and at desired speed, the latter being regulated so that the chocolate coating will have completely solidified before the end of trough 10 is passed. Any molten chocolate, accordingly, that may drip from the article will be collected in such trough and due to the circulation of the heating water in the jacket beneath, the chocolate will be kept melted and so caused to flow back again into the tank. When the right-hand end of such lowermost shaft is reached, another operator will remove the coated article from the hook and transfer the latter to the upper shaft, which will return hook to the dipping end to be used over again, the smooth space at the end of such lower shaft allowing for several articles to collect without damage, if they are not removed as promptly as they should be. The rotation of the upper shaft effects the return of the empty hooks to the first operating station where the hooks collect on the smooth portion of such shaft ready to be taken therefrom, as required, for use in the dipping of further articles.

The supply of molten chocolate in tank A, it will be understood, will be replenished, as occasion may demand, with more chololate that has been previously melted; or where only one side of the apparatus is being used, the compartment in the tank on one side of partition 7 may be utilized to melt a stock of chocolate which can then be transferred to the side that is being used, as required. It will be understood, of course, that any suitable driving means may be substituted for the motor 24 and reduction gear 25; also that the disposition made of the coated articles after they are removed from the lowermost screw shaft 20 is a matter of indifference, although I show the table 1 as extending beyond the adjacent standard 22 so as to provide for the temporary stacking of the finished articles or their wrapping, as the case may be.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In apparatus of the character described, the combination of a dipping tank, and a pair of screw-threaded shafts located above and extending to one side of said tank, said shafts rotating in such directions having regard to the thread thereon as to move hooks suspended therefrom respectively in opposite directions longitudinally of said shafts.

2. In apparatus of the character described, the combination of a table, a dipping tank supported transversely of said table adjacent one end thereof, a partition dividing said tank into two compartments on opposite sides of the median line of said table, standards rising from the respective ends of said table, two pairs of conveyors supported from said standards over the respective compartments in said tank and thence extending towards the other end of said table, the conveyors of each pair respectively traveling in opposite directions, a sloping trough connected with said tank and extending in the same direction as said conveyors, and a water-jacket enclosing the bottoms and sides of said tank and trough.

3. In apparatus of the character described, the combination of a table, a dipping tank supported transversely of said table adjacent one end thereof, a partition dividing said tank into two compartments on opposite sides of the median line of said table, standards rising from the respective ends of said table, two pairs of conveyors supported from said standards over the respective compartments in said tank and thence extending towards the other end of said table, the conveyors of each pair respectively traveling in opposite directions, a sloping trough connected with said tank and extending in the same direction as said conveyors, an inclusive water-tank enclosing the bottoms and sides of said tank and trough, water-heating means in the portion of said jacket below said tank, and a conduit leading from such means to near the outer end of the jacket below said trough.

4. In apparatus of the character described, the combination of a table, a dipping tank supported transversely of said table adjacent one end thereof, a partition dividing said tank into two compartments on opposite sides of the median line of said table, standards rising from the respective ends of said table, two pairs of conveyors supported from said standards over the respective compartments in said tank and thence extending towards the other end of said table, the conveyors of each pair respectively traveling in opposite directions, a sloping trough connected with said tank and extending in the same direction as said conveyors, an inclusive water-jacket enclosing the bottoms and sides of said tank and trough, water-heating means in the portion of said jacket below said tank, a conduit leading from such means to near the outer end of the jacket below said trough, and deflectors at the discharge end of said conduit adapted to return the water in a divided stream to the jacket below said tank.

5. In apparatus of the character described, a dipping tank comprising an inner chamber, a partition therein of inverted V-shape dividing said chamber into two compartments, an upwardly sloping trough leading from one side of said chamber adjacent such partition, an inclusive water-jacket enclosing the bottom and sides of said chamber and trough, a partition of inverted V-shape in said jacket corresponding with the partition in said chamber, and a conduit leading from within said partition in said jacket to near the outer end of the jacket below said trough.

6. In apparatus of the character described, a dipping tank comprising an inner chamber, a partition therein of inverted V-shape dividing said chamber into two compartments, an upwardly sloping trough leading from one side of said chamber adjacent such partition, an inclusive water-jacket enclosing the bottom and sides of said chamber and trough, a partition of inverted V-shape in said jacket corresponding with the partition in said chamber, a conduit leading from within said partition in said jacket to near the outer end of jacket below said trough, and deflectors at the discharge end of said conduit adapted to return the water in a divided stream to the jacket below said chamber.

Signed by me, this 4 day of February, 1922.

CHARLES B. TELLING.